(12) United States Patent
Fujiwara et al.

(10) Patent No.: US 10,981,453 B2
(45) Date of Patent: Apr. 20, 2021

(54) POWER SUPPLY CIRCUIT PROTECTION DEVICE

(71) Applicant: TOYOTA JIDOSHA KABUSHIKI KAISHA, Toyota (JP)

(72) Inventors: Nobuyoshi Fujiwara, Mishima (JP); Yoshihiko Hiroe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/597,360

(22) Filed: Oct. 9, 2019

(65) Prior Publication Data

US 2020/0139818 A1 May 7, 2020

(30) Foreign Application Priority Data

Nov. 2, 2018 (JP) .............................. JP2018-207339

(51) Int. Cl.
*H02J 3/38* (2006.01)
*B60L 3/04* (2006.01)
*H02J 7/00* (2006.01)
*B60L 15/12* (2006.01)

(52) U.S. Cl.
CPC ................. *B60L 3/04* (2013.01); *B60L 15/12* (2013.01); *H02J 7/0031* (2013.01)

(58) Field of Classification Search
CPC ........ B60L 3/04; B60L 15/12; B60L 2270/20; B60L 58/10; H02J 7/0031; H02J 7/0029; B60R 16/033
See application file for complete search history.

(56) References Cited

U.S. PATENT DOCUMENTS

| 2012/0013182 | A1* | 1/2012 | Minegishi | B60K 6/445 307/9.1 |
| 2014/0084818 | A1* | 3/2014 | Sugiyama | B60L 50/16 318/139 |
| 2018/0015891 | A1* | 1/2018 | Taniguchi | H02J 7/1423 |
| 2018/0222412 | A1* | 8/2018 | Aoki | B60R 16/033 |
| 2018/0354436 | A1* | 12/2018 | Sato | B60R 16/033 |

FOREIGN PATENT DOCUMENTS

JP 2009-290966 A 12/2009

* cited by examiner

*Primary Examiner* — Muhammad S Islam
(74) *Attorney, Agent, or Firm* — Sughrue Mion, PLLC

(57) ABSTRACT

A power circuit protection device for a vehicle including a storage device, a drive motor, and a charging terminal includes a relaying device, a fuse device and a control device. The relaying device alternatively forms a first circuit that connects the storage device and the driving motor, and a second circuit that connects the storage device and the charging terminal. The fuse device is interposed between the storage device and the relaying device. The fuse device includes a first fuse, a second fuse having a fusing characteristic that is harder to blow than that of the first fuse, and a switching mechanism. The control device controls the switching mechanism such that the second fuse is connected to the power storage device when the control device controls the relaying device so that the second circuit is connected to the control device upon receiving a predetermined charging request.

4 Claims, 5 Drawing Sheets

POWER SUPPLY CIRCUIT PROTECTION DEVICE

CROSS-REFERENCE TO RELATED APPLICATION

The present application is based on, and claims priority from, Japanese Patent Application Serial Number 2018-207339, filed on Nov. 2, 2018, the disclosure of which is hereby incorporated by reference herein in its entirety.

FIELD

The present disclosure relates to a power supply circuit protection device, and more particularly, to a power supply circuit protection device for protecting a power supply circuit of an electric vehicle from an overcurrent.

BACKGROUND

Japanese Patent Laid-Open No. 2009-290966 discloses a technique related to a power supply protection device for protecting a battery from an overcurrent. In this technique, a first path through a high-current fuse that can be interrupted by a first current and a second path through a low-current fuse that can be interrupted by a second current smaller than the first current and provided in parallel to the first path are formed as a current-carrying path in series with the battery. While power is supplied, the power is supplied through the first path, and while power supply is stopped, the power is supplied through the second path. As a result, while a minute short circuit occurs at the time of stopping the power supply, discharge of the battery is suppressed by cutting off the low-current fuse.

SUMMARY

The power storage device, which is the power source of the driving motor, is charged by electric power supplied from an external charging facility. In the charging of the power storage device, the larger the supplied electric power is, the shorter the charging time can be. For this reason, the power supply circuit corresponding to such rapid charging may be continuously supplied with power larger than the power assumed during normal driving. In this case, since the current load of the power supply circuit at the time of driving and the current load of the power supply circuit at the time of charging are largely different from each other, it may be difficult to protect both the power supply circuit at the time of running and the power supply circuit at the time of charging from overcurrent.

The present disclosure has been made in view of the above-mentioned problems, and an object thereof is to provide a power supply circuit protection device capable of simultaneously protecting a power supply circuit during driving of a vehicle and during charging.

The first disclosure is applied to a power circuit protection device for a vehicle in order to achieve the above purpose. The vehicle includes a storage device used as a driving power source for the vehicle, a drive motor to receive a supply of electricity stored in the storage device, and a charging terminal to charge the storage device. The power circuit protection device includes a relaying device, a fuse device and a control device for controlling the relaying device and the fuse device. The relaying device alternatively forms a first circuit that connects the storage device and the driving motor, and a second circuit that connects the storage device and the charging terminal. The fuse device is interposed between the storage device and the relaying device. The fuse device includes a first fuse, a second fuse, and a switching mechanism. The second fuse has a fusing characteristic that is harder to blow than that of the first fuse. The switching mechanism is configured to switch a connection destination of the power storage device between the first fuse and the second fuse in an alternative manner. The control device is configured to control the switching mechanism such that the second fuse is connected to the power storage device when the control device controls the relaying device so that the second circuit is connected to the control device upon receiving a predetermined charging request.

The second disclosure has the following further features in the first disclosure.

The predetermined charge requirement is a charge request for supplying power of 150 kW or more to the power storage device.

The third disclosure has the following further features in the first disclosure.

A time until the second fuse is blown under a predetermined current condition is longer than a time until the first fuse is blown under the same current condition.

The fourth disclosure has the following features in the first disclosure.

The relaying device includes a first relay for switching connection and disconnection of the first circuit and a second relay for switching connection and disconnection of the second circuit. The control device is configured to connect the second circuit by the second relay and disconnect the first circuit by the first relay upon receiving the charging request.

The fifth disclose has the following features in the first disclosure.

The control device is configured to control the switching mechanism in a condition in which both the first circuit and the second circuit are disconnected when the charging request is received.

According to the first disclosure, when the relaying device is controlled so that the second circuit is connected in response to a predetermined charge request, the switching mechanism is controlled so that the second fuse is connected to the power storage device. This makes it possible to effectively protect the power supply circuit by the second fuse even when charging is performed with a higher current load than the current load during driving.

According to the second disclosure, it is possible to achieve both protection of the power supply circuit at the time of ultra-rapid charging in which power of 150 kW or more is supplied and protection of the power supply circuit at the time of driving.

According to the third disclosure, the second fuse can be configured as a fuse that is harder to blow than the first fuse.

According to a fourth disclosure, a relaying device includes a first relay and a second relay. According to such a configuration, connection and disconnection of the first circuit and the second circuit can be switched by using different relays.

According to the fifth disclosure, when a charge request is received, the switching mechanism is controlled so that the second fuse is connected in a condition in which the first circuit and the second circuit are disconnected by the relaying device. As a result, it is possible to cut off the energization at the time of the connection operation by the switching mechanism, so that it is possible to provide a device with high safety.

DETAILED DESCRIPTION

Hereinafter, embodiments of the present disclosure will be described with reference to the accompanying drawings. However, it is to be understood that even when the number, quantity, amount, range or other numerical attribute of each element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly described otherwise, or unless the present disclosure is explicitly specified by the structures, steps or the like theoretically.

Figure 1:
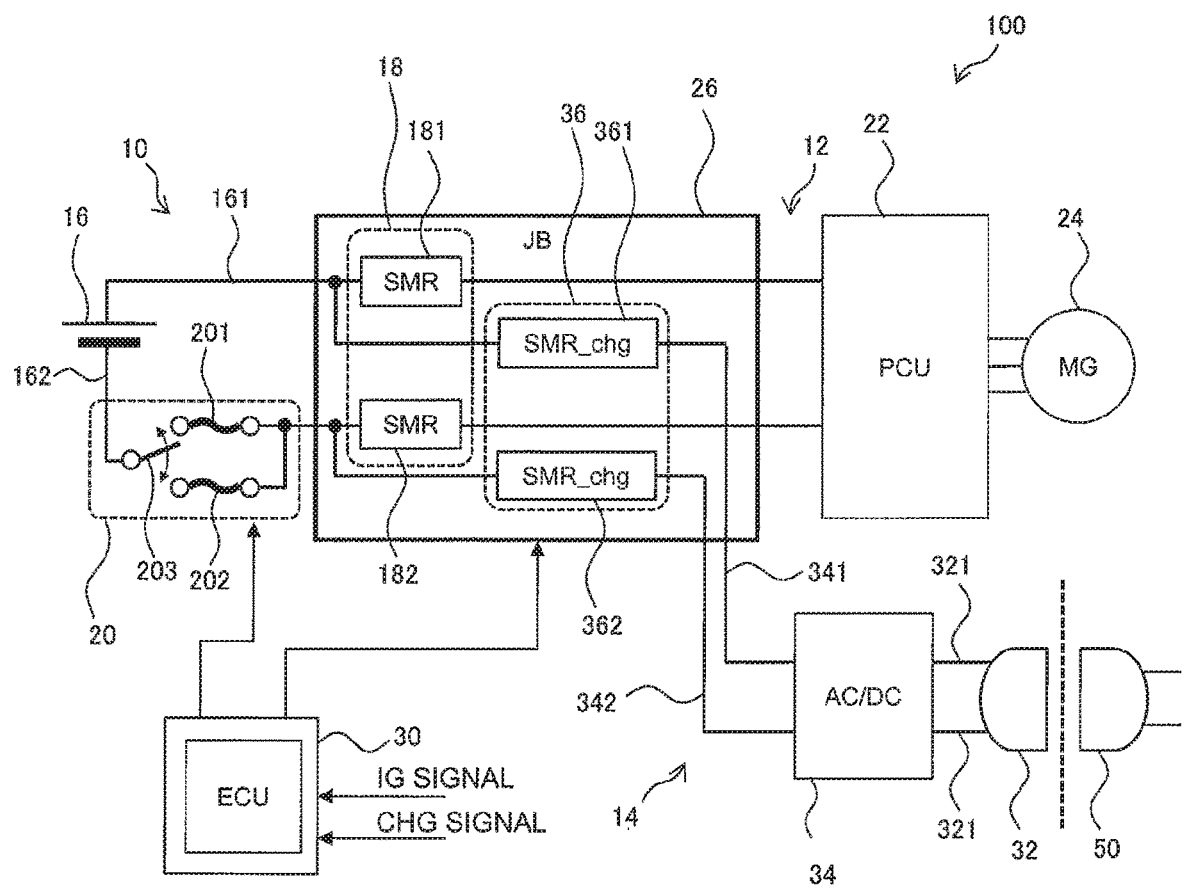
FIG. 1 is a diagram showing a schematic configuration of a power supply circuit protection device according to First embodiment.

First Embodiment 1-1. Configuration of Power Supply Circuit Protection Device of First Embodiment First embodiment of the present disclosure will be described below with reference to the drawings. FIG. 1 is a diagram showing a schematic configuration of a power supply circuit protection device according to the first embodiment. A power supply circuit protection device 100 is mounted on a vehicle including a power storage device as a driving power supply and a driving motor, such as an electric vehicle or a hybrid vehicle, for example.

As shown in FIG. 1, the power supply circuit protection device 100 according to the first embodiment includes a power supply circuit 10. The power supply circuit 10 includes a driving circuit 12 as a first circuit and a charging circuit 14 as a second circuit.

The driving circuit 12 is a circuit for supplying electric power from a power storage device 16 to a driving motor 24 via a power control unit (hereinafter, also referred to as "PCU") 22. Specifically, the driving circuit 12 includes the power storage device 16, a system main relay (hereinafter, also referred to as "SMR") 18 as a first relay for switching connection and disconnection of the driving circuit 12, and a fuse device 20.

The storage device 16 is composed of a direct-current assembly battery that connects multiple unit batteries. The power storage device 16 is configured to be capable of outputting a current value of 420A by assembling, for example, 96 single cells composed of a lithium ion battery or a nickel metal hydride battery in three parallel.

The SMR 18 is configured as a part of a relaying device included in the power supply circuit protective device 100, and is provided in a path between the power storage device 16 and the PCU 22. The SMR 18 shuts off the power supply between the power storage device 16 and the PCU 22 when there is no need to supply power to the PCU 22, such as when the ignition switch is off. The SMR 18 is housed inside a junction box 26.

The SMR 18 has a contact point for switching between an open state and a closed state in accordance with a command from a ECU 30 to be described later. By opening and closing the contact, electric disconnection and connection between the power storage device 16 and the PCL 22 are switched. The SMR 18 of the first embodiment includes two contacts 181 and 182. The contact 181 is provided in the middle of a positive electrode side power line 161 connected to the positive electrode of the power storage device 16. The contact 182 is provided in the middle of a negative electrode side power line 162 connected to the negative electrode of the power storage device 16. The two contacts 181 and 182 are opened and closed at the same time in accordance with a command from the ECU 30.

The PCU 22 is for controlling the driving motor 24. Specifically, the PCU 22 receives electric power supplied from the power storage device 16 and operates the driving motor 24 as a driving source of the vehicle.

The fuse device 20 is a device for protecting the power supply circuit 10 from an overcurrent. The configuration of the fuse device 20 will be described in detail later.

On the other hand, the charging circuit 14 is a circuit for supplying power from an external charging facility 50 such as a charging station or a household power supply to the power storage device 16 to charge the power storage device 16. Specifically, the charging circuit 14 includes a charging terminal 32, a charger 34, and a charging system main relay (hereinafter also referred to as "SMR_chg") 36 as a second relay for switching connection and disconnection of the charging circuit 14, in addition to the power storage device 16 and the fuse device 20 common to the driving circuit 12.

The charging terminal 32 is connected to the external charging facility 50 for charging the power storage device 16. The external charging facility 50 is an external charging facility capable of ultra-rapid charging for supplying electric power of 150 kW or more. When the charging terminal 32 is connected to the external charging facility 50, AC power from the external charging facility 50 is input to the charger 34 via an AC power line 321.

The charger 34 is a device having a AC-DC converting function for converting AC power from the external charging facility 50 into DC power. The DC power converted by the charger 34 is supplied to a positive DC power line 341 and a negative DC power line 342. In addition, the charger 34 transmits a CHG signal to the ECU 30, the CHG signal indicating that the charging terminal 32 is connected to the external charging facility 50, that is, that a charging request for the power storage device 16 is issued.

The positive DC power line 341 is connected to the positive power line 161 that connects between the contact point 181 of the SMR 18 and the power storage device 16, in the JB 26. The negative DC power line 342 is connected to the negative DC power line 162 that connects between the contact 182 of the SMR 18 and the fuse device 20, in the JB 26.

The SMR_chg 36 is configured as a part of a relaying device included in the power supply circuit protection device 100, and is provided in a path between the power storage device 16 and the charger 34. The SMR_chg 36 electrically connects the power storage device 16 and the charger 34 when the ECU 30 receives a CHG signal indicating that the charging terminal 32 is connected to the external charging facility 50. The SMR_chg 36 is housed inside the JB 26.

The SMR_chg 36 has a contact point for switching between an open state and a closed state in accordance with a command from the ECU 30. By opening and closing the contact, electrical disconnection and connection between the power storage device 16 and the charger 34 are switched. The SMR_chg 36 of the first embodiment includes two contacts 361, 362. The contact 361 is provided in the middle of the positive DC power line 341 connected to the positive electrode of the charger 34. The contact 362 is provided in the middle of the negative DC power line 342 connected to the negative electrode of the charger 34. The two contacts 361 and 362 are opened and closed at the same time in accordance with a command from the ECU 30.

The fuse device 20 is interposed in the middle of the negative electrode-side power line 162 between the power storage device 16 and the JB 26. The fuse device 20 includes a first fuse 201, a second fuse 202, and a switching mechanism 203. The first fuse 201 and the second fuse 202 are connected so as to be interposed in parallel in the middle of the negative electrode side power lines 162. The switching device 203 is a device for alternatively switching a destination connected to the power storage device 16 between the first fuse 201 and the second fuse 202 in response to a command from the ECU 30 to be described later. That is, in the fuse device 20, either one of the first fuse 201 and the second fuse 202 is interposed in a path in the negative electrode side power line 162.

The power supply circuit protection device 100 includes the ECU (Electronic Control Unit) 30 as a control device. The ECU 30 is a microcomputer including a RAM (Random Access Memory), a ROM (Read Only Memory), a CPU (Central Processing Unit), and an input/output interface. In addition to the above-mentioned CHG signal, an IG signal indicating that the ignition switch of the vehicle is turned on is inputted to the ECU 30. The ECU 30 controls the operation of the SMR 18, the SMR_chg 36, and the fuse device 20 based on the inputted signals.

1-2. Operation of Power Supply Circuit Protection Device of First Embodiment

Next, a characteristic operation of the power supply circuit protection device 100 according to the first embodiment will be described. The power supply circuit 10 included in the power supply circuit protection device 100 according to the first embodiment supplies the electric power of the power storage device 16 to the driving motor 24 using the driving circuit 12 when the vehicle is driven. When charging the power storage device 16, the power supply circuit 10 uses the charging circuit 14 to supply the power of the external charging facility 50 to the power storage device 16.

Here, in the case of charging the power storage device 16, it is necessary to supply larger electric power to the power storage device 16 as the charging speed is increased. For example, in the case of rapid charging, generally, a power of about 50 kW is required, whereas in the case of very rapid charging, which is more rapid than in the case of rapid charging, a power of 150 kW or more is required. The power supply circuit 10 in the power supply circuit protecting device 100 of the first embodiment is constructed so that the joule heat integration value at the time of super-rapid charging ($Ic^2 \ast Tc$) obtained by multiplying the squares of the current value Ic at the time of super-rapid charging by the maximum charging time Tc is larger than the joule heat integration value at the time of driving ($Id^2 \ast Td$) estimated from the current requirement value Id assumed at the time of driving and from the continuous driving time Td. Therefore, in the power supply circuit protection device 100 of the first embodiment, the current load at the time of ultra-rapid charging greatly deviates from the current load at the time of driving.

Figure 2:
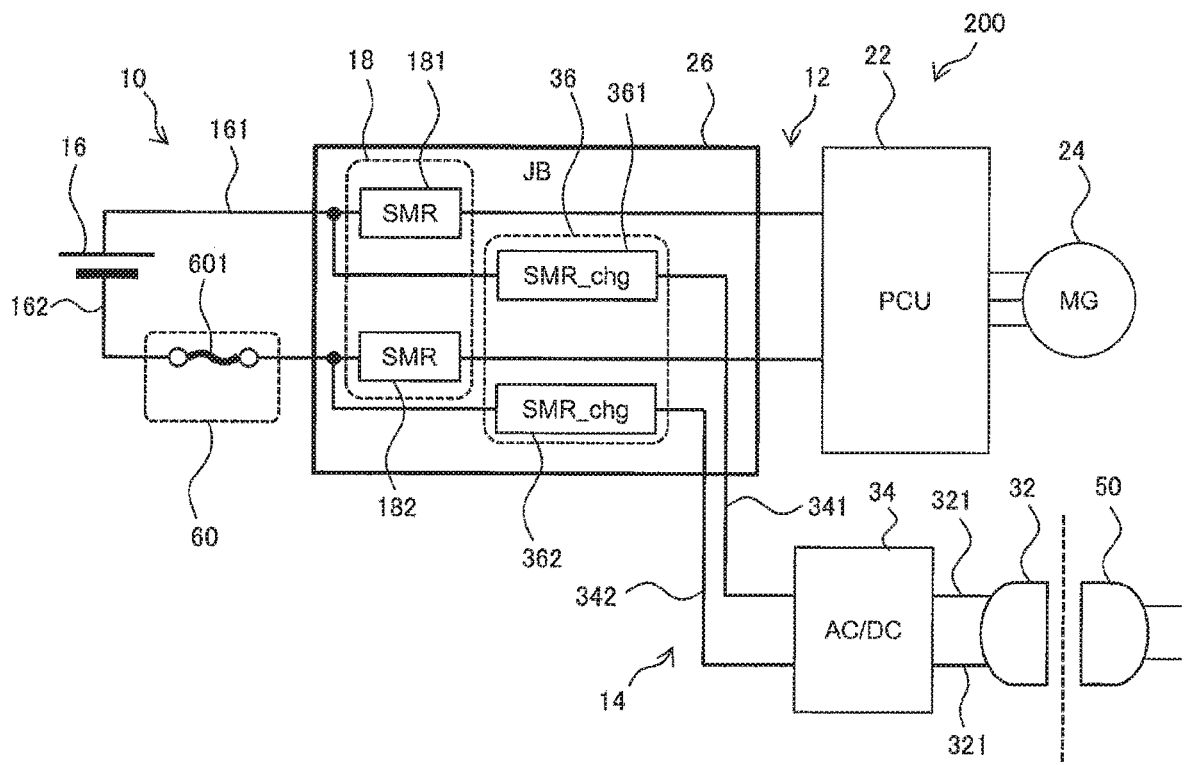
FIG. 2 is a diagram showing a comparative example of the power supply circuit protection device according to the first embodiment.

FIG. 2 is a diagram showing a comparative example of the power supply circuit protection device according to the first embodiment. The power supply circuit protection device 200 of the comparative example shown in this figure has the same configuration as that of the first embodiment except for the configuration of the fuse device 60. In the comparative example shown in this figure, a common fuse 601 is used for both the driving circuit 12 formed at the time of driving and the charging circuit 14 formed at the time of ultra-rapid charging is used.

When such a configuration of the comparative example is adopted as the power supply circuit protection device, it may be difficult to protect the power supply circuit 10 in both the driving and ultra-rapid charging scenes. Specifically, if the blowing characteristic of the fuse is specified so as to satisfy the requirement for protection of the charging circuit 14 at the time of ultra-rapid charging, the power supply circuit 10 may not be effectively shut off against an overcurrent during driving. On the contrary, if the blowing characteristic of the fuse is specified so as to satisfy the requirement for protection of the driving circuit 12 during driving, the fuse device 20 may become insufficiently durable due to repetition of the ultra-rapid charge.

Therefore, the power supply circuit protection device 100 according to the first embodiment includes the fuse device 20 capable of switching a fuse interposed in the power supply circuit 10. In the fuse device 20, one of a first fuse 201 and a second fuse 202 is interposed in the power supply circuit 10 by the switching mechanism 203.

The first fuse 201 is a driving fuse selected mainly when the vehicle drives. The first fuse 201 has a fusing characteristic corresponding to a requirement of a current load at the time of driving. When high load driving is performed, for example, power of about 150 kW may be required in a short time of about 10 seconds. The first fuse 201 needs to have a blowing characteristic corresponding to such a current load. Therefore, in one or more embodiment, when selecting the fuse blowing characteristic, the relationship between the blowing current I and the blowing time T (hereinafter referred to as "I-T characteristic") or the Joule thermal integration value described above may be used as an index.

The second fuse 202 is a charging fuse selected at the time of ultra-rapid charging of the power storage device 16. The second fuse 202 has a blowing characteristic corresponding to a requirement of a current load at the time of ultra-rapid charging.

Figure 3:
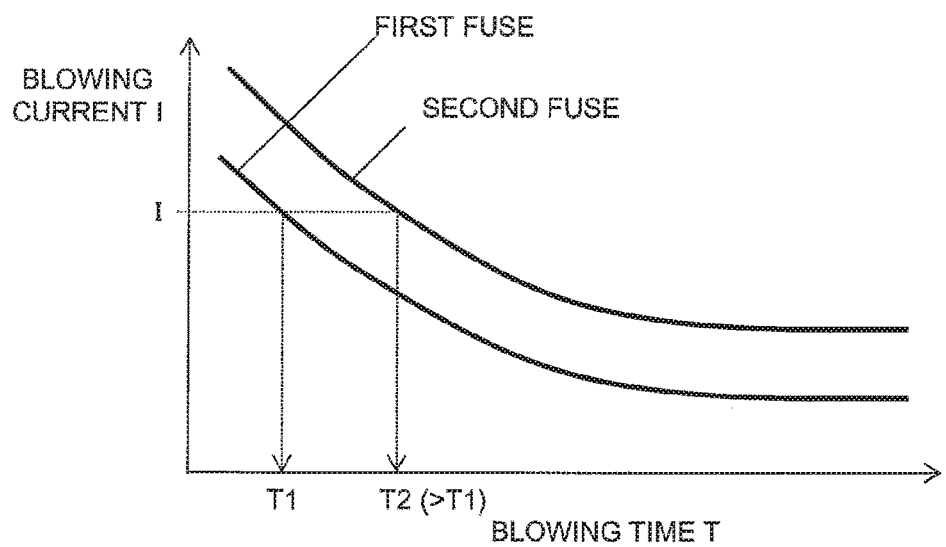
FIG. 3 is a diagram showing an example of I-T characteristics of a fuse used in a fuse device.

When comparing the blowing characteristics of the first fuse 201 and the blowing characteristics of the second fuse 202, the second fuse 202 has a blowing characteristic that is harder to blow than the first fuse 201. FIG. 3 is a diagram showing an example of I-T characteristics of a fuse used in a fuse device. As shown in this figure, the blowing time T2 until the second fuse 202 is blown under the current condition to which the arbitrary blowing current I is added is longer than the blowing time T1 until the first fuse 201 is blown under the same current condition.

Figure 4:
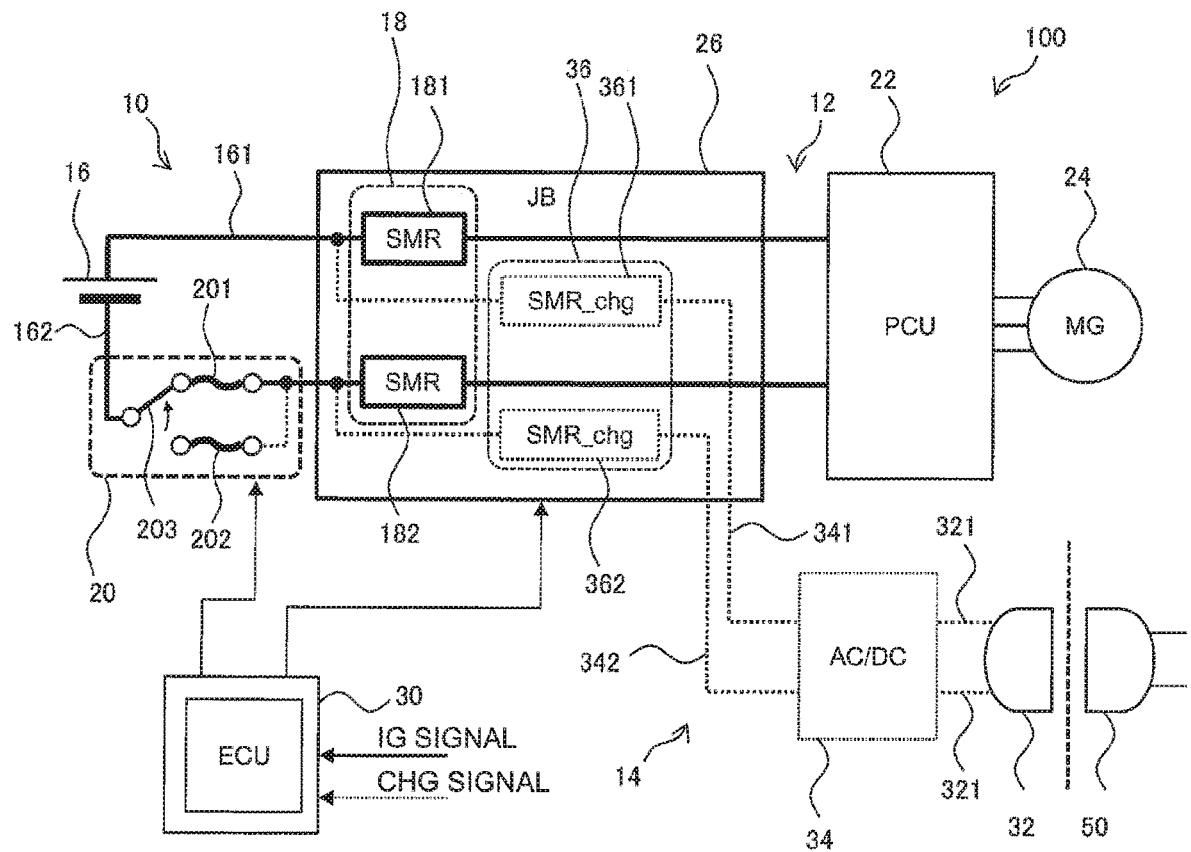
FIG. 4 is a diagram for explaining a circuit configuration of a power supply circuit during driving.

The switching mechanism 203 switches the fuse interposed in the middle of the negative electrode side power line 162 depending on whether the vehicle is driving or charging. FIG. 4 is a diagram for explaining a circuit configuration of a power supply circuit during driving. As shown in this figure, when the vehicle is driving, the contact point of the switching mechanism 203 is connected to the side of the first fuse 201. When the vehicle is driving, the contacts 181 and 182 of the SMR 18 are closed, and the contacts 361 and 362 of the SMR_chg 36 are opened. As a result, when the vehicle is driving, the power storage device 16 acid the PCU 22 are electrically connected, and the first fuse 201 is connected in series between the power storage device 16 and the PCU 22. As described above, the first fuse 201 has a fusing characteristic that satisfies the requirement of a current load during driving. Therefore, according to the power supply circuit protection device 100 of the first embodiment, the power supply circuit 10 can be protected from an overcurrent during driving.

Figure 5:
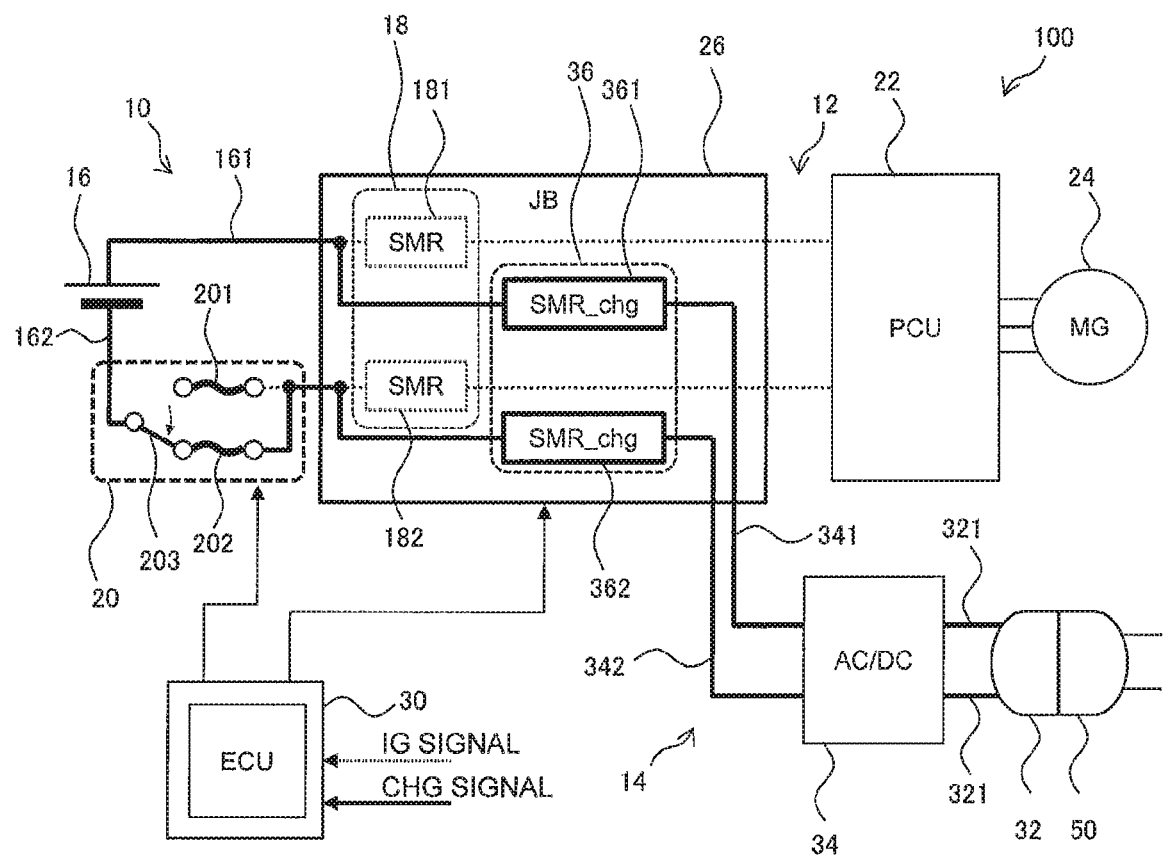
FIG. 5 is a diagram for description of circuit configuration during ultra-rapid charging.

FIG. 5 is a diagram for explaining a circuit configuration at the time of ultra-rapid charging. As shown in this figure, at the time of ultra-rapid charging of the power storage device 16, the contact point of the switching mechanism 203 is connected to the side of the second fuse 202. At the time of ultra-rapid charge, the contacts 361 and 362 of the SMR_chg 36 are closed, and the contacts 181 and 182 of the SMR 18 are opened. As a result, at the time of ultra-rapid charging, the power storage device 16 and the charger 34 are electrically connected, and the second fuse 202 is connected in series between the power storage device 16 and the charger 34. As described above, the second fuse 202 has a blowing characteristic that satisfies the requirement of a current load at the time of ultra-rapid charge. Therefore, according to the power supply circuit protection device 100 of the first embodiment, it is possible to protect the power supply circuit 10 from an overcurrent at the time of ultra-rapid charging.

1-3. Specific Processing Executed in the Power Supply Circuit Protection Device of the First Embodiment Next, specific processes of routine executed by the ECU 30 will be described with reference to flowchart.

Figure 6:
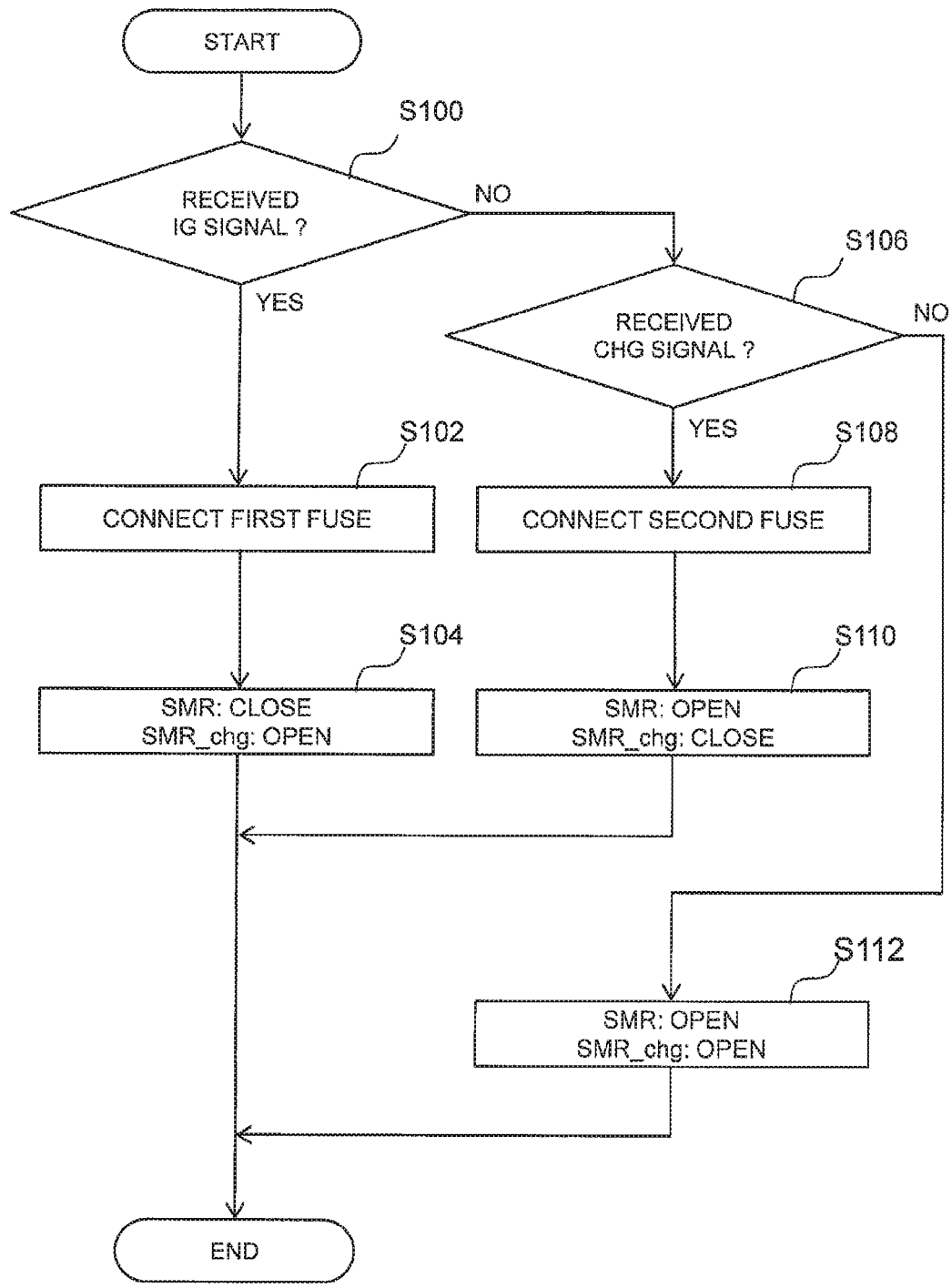
FIG. 6 is a flowchart of a routine executed in the power supply circuit protection device according to the first embodiment.

FIG. 6 is a flowchart of a routine executed in the power supply circuit protection device according to the first embodiment. The routine shown in FIG. 6 is repeatedly executed by the ECU 30 in a predetermined control cycle. In step S100 of the routine shown in FIG. 6, first, the ECU 30 determines whether or not an IG signal indicating that the ignition switch is turned on has been received. As a result, if it is determined that the determination is satisfied, the process proceeds to the next step S102.

In step S102, the ECU 30 controls the fuse device 20. More specifically, the ECU 30 operates the switching device 203 to connect the contact of the first fuse 201 to the negative power line 162, When the process of step S102 is completed, the process proceeds to step S104.

In step S104, the ECU 30 controls the relaying device. Specifically, the ECU 30 operates the connection state of the SMR 18 to the closed state, and operates the connection state of the SMR_chg 36 to the open state. That is, while the ignition switch is on, the SMR 18, which is a relaying device, is kept connected. When the processing of step S104 is completed, the processing of this routine is terminated.

On the other hand, if the determination is not satisfied in the process of the step S100, the process proceeds to the next step S106. In step S106, the ECU 30 determines whether or not ultra-rapid charge is being performed. Here, the ECU 30 determines whether it has received a CHG signal from the charger 34, the CHG signal indicating that the charging terminal 32 is connected to the external charging facility 50. As a result, when it is determined that the determination is established, the process proceeds to step S108.

In step S108, the ECU 30 controls the fuse device 20. More specifically, the ECU 30 operates the switching device 203 to connect the contact of the second fuse 202 to the negative power line 162. When the processing of step S108 is completed, the processing proceeds to step S110.

In step S110, the ECU 30 controls the relaying device. Specifically, the ECU 30 operates the connected state of the SMR_chg 36 to a closed state in preparation for charging the power storage device 16, and operates the SMR 18 connection state to the open state. That is, the SMR_chg 36, which is the relaying device, is maintained in the connected state during the period in which the ignition switch is OFF and the ultra-rapid charging is executed. When the processing of step S110 is completed, the processing of this routine is terminated.

If it is determined that the above is not established in the process of step S106, the process proceeds to step S112. In step S112, the ECU 30 controls the relaying device. In particular, the ECU 30 operates both the SMR 18 and SMR_chg 36 connected states to the open state. That is, while the ignition switch is off and the super-rapid charging is not executed, both the SMR. 18 and the SMR_chg 36, which are relaying devices, are kept open in order to suppress power dissipation in the power storage device 16. When the processing of step S112 is completed, the processing of this routine is terminated.

As described above, according to the processing of the routine shown in FIG. 6, the fuse can be selectively used at the time of driving the vehicle and at the time of charging the vehicle. This makes it possible to optimize the fuse used during driving and the fuse used during charging in accordance with the respective requirements.

Further, in the power supply circuit protection device 100 of the first embodiment, since the fuse is alternatively connected by the switching device 203, even if a short circuit occurs in the JB 26, a current does not flow to both the first fuse 201 and the second fuse 202 at the same time. Accordingly, since the first fuse 201 and the second fuse 202 can be properly operated, the power supply circuit 10 can be protected from an overcurrent.

According to the processing of the routine shown in FIG. 6, when the switching unit 203 of the fuse device 20 is operated, the connection state of both the SMR 18 and the SMR_chg 36 are always controlled to the open state in the processing of the step S112 of the previous routine. As a result, it is possible to prevent the switching mechanism 203 from being operated in the energized state, so that it is possible to protect the power supply circuit 10 from an overcurrent that may occur at the time of switching.

1-4. Modified Examples

The power supply circuit protection device 100 according to the first embodiment may be modified as described below.

The charging terminal 32 may be configured to be connectable to an external charging facility that supplies DC power. In this instance, the charger 34 may be configured as a device having a DC-DC converting function for converting DC power inputted from an external charging facility into DC power suitable for charging.

The SMR 18 is not limited to a configuration having o contacts 181 and 182. That is, the SMR 18 may have one or more contacts. Similarly, the configuration of the SMR_chg 36 is not limited to the configuration having the two contacts 361 and 362. That is, the SMR_chg 36 may have one or more contacts.

Depending on the charging mode, the current load at the time of charging may not deviate from the current load at the time of driving. For example, in the case of rapid charging using an electric power of around 50 kW or normal charging using an electric power of less than that, the switching mechanism 203 may be operated to connect the second fuse 202 as in the case of driving. This makes it possible to protect the power supply circuit 10 from an overcurrent even during normal charging or rapid charging.

Figure 7:
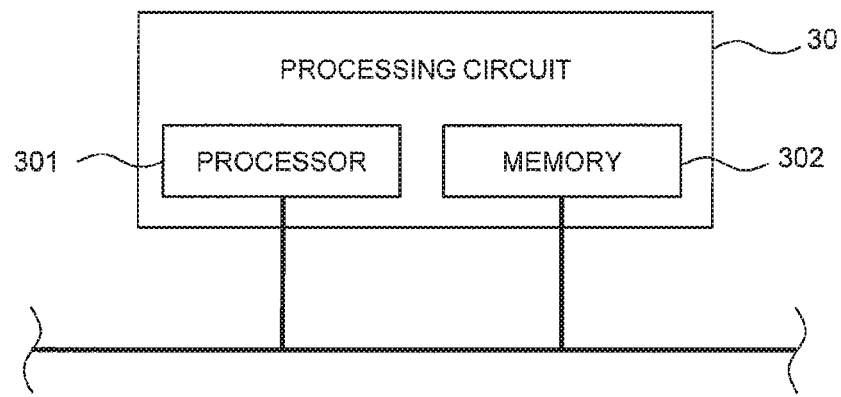
FIG. 7 is a diagram showing an example of a hardware configuration of an ECU included in the power supply circuit protection device according to the first embodiment.

Further, the ECU 30 included in the power supply circuit protection device 100 according to the first embodiment may be configured as follows. FIG. 7 is a diagram showing an example of a hardware configuration of the ECU included in the power supply circuit protection device according to the first embodiment. The individual functions of the ECU 30 included in the power supply circuit protecting device 100 according to the first embodiment are implemented by a processing circuitry. In the example shown in FIG. 7, the processing circuitry of the ECU 30 includes at least one processor 301 and at least one memory 302.

In the case where the processing circuitry includes at least one processor 301 and at least one memory 302, the individual functions of the ECU 30 may be implemented by software, firmware, or a combination of software and firmware. At least one of the software and the firmware is described as a program. At least one of the software and the firmware is stored in at least one memory 302. At least one processor 301 implements the individual functions of the ECU 30 by reading and executing a program stored in at least one memory 302. At least one processor 301 is also referred to as a CPU (Central Processing Unit), a central processor, a processing unit, an arithmetic unit, a microprocessor, a microcomputer, or a DSP (Digital Signal Processor). For example, at least one memory 302 is, e.g., a non-volatile or volatile semiconductor memory such as a RAM (Random Access Memory), a ROM (Read Only Memory), a flash memory, an EPROM (Erasable Programmable Read Only Memory, or an EEPROM (Electrically Erasable Programmable Read-Only Memory), a magnetic disk, a flexible disk, an optical disk.

Figure 8:
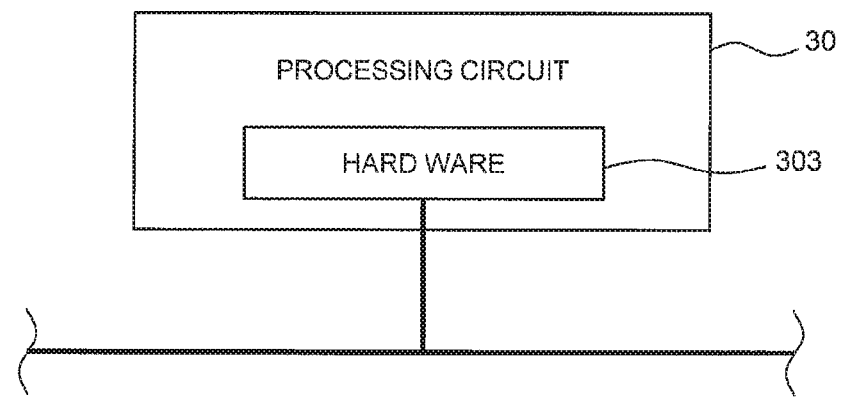
FIG. 8 is a diagram showing another example of the hardware configuration of the ECU included in the power supply circuit protection device according to the first embodiment.

FIG. 8 is a diagram showing another example of the hardware configuration of the ECU included in the power supply circuit protection device according to the first embodiment. In the example shown in FIG. 8, the processing circuitry of the ECU 30 includes at least one dedicated hardware 303.

In the case where the processing circuitry includes at least one dedicated hardware 303, the processing circuitry may be, e.g., a single circuit, a composite circuit, a programmed processor, a parallel programmed processor, a ASIC (Application Specific Integrated Circuit, an FPGA (Field-Programmable Gate Array), or a combination thereof. The functions of the individual units of the ECU 30 may be implemented individually by the processing circuitry. In addition, the functions of the individual units of the ECU 30 may also be implemented collectively by the processing circuitry.

Further, part of the individual functions of the ECU 30 may be implemented by the dedicated hardware 303, and the other thereof may be implemented by software or firmware. As described above, the processing circuitry implements the individual functions of the ECU 30 by the hardware 303, the software, the firmware, or a combination thereof.

What is claimed is:

1. A power circuit protection device for a vehicle, the vehicle comprising a power storage device used as a driving power source for the vehicle, a drive motor to receive a supply of electricity stored in the power storage device, and a charging terminal to charge the power storage device, the power circuit protection device comprising:
    a relaying device for alternatively forming a first circuit that connects the power storage device and the driving motor, and a second circuit that connects the power storage device and the charging terminal;
    a fuse device interposed between the power storage device and the relaying device, the fuse device comprising:
    a first fuse;
    a second fuse; and
    a switching mechanism for switching a connection destination of the power storage device between the first fuse and the second fuse in an alternative manner; and
    a control device for controlling the relaying device and the fuse device, the control device being configured to control the switching mechanism such that the second fuse is connected to the power storage device when the control device controls the relaying device so that the second circuit is connected to the control device upon receiving a predetermined charging request, and
    wherein a time until the second fuse is blown under a predetermined current condition is longer than a time until the first fuse is blown under the same current condition.

2. The power supply circuit protection device according to claim 1,
    wherein the predetermined charging request is a charge request for supplying power of 150 kW or more to the power storage device.

3. The power supply circuit protection device according to claim 1,
    wherein the relaying device includes a first relay for switching connection and disconnection of the first circuit and a second relay for switching connection and disconnection of the second circuit, and
    wherein the control device is configured to connect the second circuit by the second relay and disconnect the first circuit by the first relay upon receiving the charging request.

4. The power supply circuit protection device according to claim 1,
    wherein the control device is configured to control the switching mechanism in a condition in which the first circuit and the second circuit are shut off upon receiving the charging request.

* * * * *